United States Patent [19]

Tsujioka et al.

[11] Patent Number: 5,592,461
[45] Date of Patent: Jan. 7, 1997

[54] METHODS OF RECORDING AND REPRODUCING INFORMATION USING AN OPTICAL RECORDING MEDIUM

[75] Inventors: Tsuyoshi Tsujioka, Osaka; Masahiro Irie, 1-29-4-404, Kasugakouen, Kasuga-city, Fukuoka, both of Japan

[73] Assignees: Sanyo Electric Co., Ltd., Osaka; Masahiro Irie, Fukuoka, both of Japan

[21] Appl. No.: 356,589

[22] Filed: Dec. 15, 1994

[30] Foreign Application Priority Data

Dec. 16, 1993 [JP] Japan ................................. 5-316744

[51] Int. Cl.$^6$ ..................................................... G11B 7/24
[52] U.S. Cl. .......................... 369/126; 369/285; 369/288; 369/116; 369/275.2; 428/436; 428/64.4; 428/65.1; 430/945
[58] Field of Search ........................... 369/126, 288, 369/272.2, 116, 285; 359/4; 430/290, 338, 19, 332, 343, 270, 495, 945, 962; 428/435, 436, 65.1, 64.4

[56] References Cited

U.S. PATENT DOCUMENTS

| | | | |
|---|---|---|---|
| 5,175,079 | 12/1992 | Van et al. | 430/338 |
| 5,284,691 | 2/1994 | Taniguchi et al. | 430/945 |
| 5,294,522 | 3/1994 | Uchida et al. | 430/962 |
| 5,436,885 | 7/1995 | Okumura et al. | 369/275.2 |
| 5,460,907 | 10/1995 | Ducharme et al. | 430/290 |
| 5,464,673 | 11/1995 | Watanabe et al. | 428/65.1 |

FOREIGN PATENT DOCUMENTS

| | | |
|---|---|---|
| 470864A1 | 2/1992 | European Pat. Off. . |
| 566233A1 | 2/1993 | European Pat. Off. . |
| 4214978A1 | 1/1993 | Germany . |
| 5-242524 | 9/1993 | Japan . |
| 5-225611 | 9/1993 | Japan . |
| 5-266478 | 10/1993 | Japan . |

OTHER PUBLICATIONS

Bull. Chem. Soc. Jpn.; "Thermally Irreversible Photochromic Systems. Reversible Photocyclization of 1,2–Bis(benso [b]thiphen–3–yl)ethene Derivatives"; 63, 1311–1315 (1990).

"Optical Recording Characteristics of Photochromic Media" Symposium on Optical Memory 1994.

*Primary Examiner*—Georgia Y. Epps
*Assistant Examiner*—Kim-Kwok Chu
*Attorney, Agent, or Firm*—Nikaido, Marmelstein, Murray & Oram LLP

[57] ABSTRACT

An optical recording medium is provided with a masking layer on a side of a recording layer for receiving a reproducing beam. The masking layer is prepared from that containing photochromic dye molecules having absorption at the wavelength of the reproducing beam and causing a photon mode reaction by absorbing the reproducing beam to be reduced in absorption.

8 Claims, 7 Drawing Sheets

COORDINATE ALONG TRACK WIDTH
( μm )

FIG. 6

COORDINATE ALONG TRACK WIDTH
( μm )

METHODS OF RECORDING AND REPRODUCING INFORMATION USING AN OPTICAL RECORDING MEDIUM

BACKGROUND OF THE INVENTION

1. Field of the Invention

The present invention relates to an optical recording medium which is capable of high-density recording and reproduction, and a recording/reproducing method therefor.

2. Description of the Background Art

In recent years, the so-called MSR (magnetically induced super resolution) system is watched with interest as super resolution means for recording/reproducing information in/from a region smaller than a recording spot which is decided by a light diffraction limit. Examples of such an MSR system are disclosed in Technical Digest of Optical Data Storage Topical Meeting 1991, Vol. 5, pp. 112 to 115 (Lecture No. TuB-3) and pp. 116 to 119 (Lecture No. TuB-4), for example. This system is characterized in that a magneto-optical recording film consisting of a plurality of layers is employed with provision of a masking layer for masking peripheral information other than that of an information recording layer. Recorded information (recorded marks) is transferred to the masking layer which is increased in temperature by irradiation with a relatively strong reproducing beam, whereby influences by adjacent tracks and recorded marks in a linear density direction are suppressed and the optical resolution is improved even if the recording density is increased.

As to an optical recording medium for attaining a similar super resolution effect, Japanese Patent Laying-Open No. 5-225611 (1993) discloses a medium which is provided with a layer including a light absorption center causing nonlinear light absorption such as saturable absorption as a masking layer, for example. The saturable absorption is such a property that electrons are efficiently excited when the beam intensity is weak since most of electrons in the absorption center are in ground states while the ratio of electrons excited from ground states is reduced when the beam intensity is strong since most of electrons are excited. Thus, this layer absorbs light when the light intensity is low, while its absorbance is reduced when the light intensity is increased. When the medium which is provided with the layer having such a saturable absorption property is irradiated with a strong reproducing beam for reproducing information, therefore, the reproducing beam will not reach the recording layer in the periphery of its spot due to high absorption for low light intensity, while the reproducing beam can reach the recording layer around the center of the spot due to small absorption for high light intensity. Thus, it is possible to attain a super resolution effect similarly to the aforementioned MSR system.

Japanese Patent Laying-Open No. 5-242524 (1993) also discloses a recording/reproducing method employing an additive layer which contains spiro selenazolino benzopyran exhibiting reverse photochromism and whose transmittance changes in response to the intensity of irradiation light. As to a similar technique, further, Japanese Patent Laying-Open No. 5-266478 (1993) discloses a method employing a masking layer, which is non-transmittable with respect to a reproducing beam in general, having such a property that only its central portion exhibits transmissibility upon irradiation with a reproducing beam which is so controlled that its central portion is in excess of a prescribed intensity level and again exhibits non-transmissibility after passage of the reproducing beam. The material for this masking layer may be prepared from indoline spiropyran exhibiting reverse photochromism.

In the conventional method employing the aforementioned MSR system, however, the recording medium is disadvantageously restricted to a magneto-optical recording medium. Further, it is difficult to attain a high C/N ratio since the temperature of a magnetic layer provided in the medium is increased through a beam of relatively high intensity for reproduction. When as studied in general a green or blue laser beam is employed so that a recording/reproducing laser beam is reduced in wavelength for high densification, it is necessary to employ a new magneto-optical recording material which is different from those for the near infrared laser beam as currently employed. In this case, it is necessary to design new magnetic properties of the magnetic layer, in order to implement the MSR effect. Further, an influence is exerted by thermal diffusion due to an effect of heat which is employed for transferring recorded information to the masking layer, and hence it is difficult to apply the method to mark edge recording, which is effective means for high densification.

In the method of employing the layer including the absorption center having nonlinear light absorption as the masking layer, the recording medium is not restricted to a magneto-optical recording medium, dissimilarly to the MSR system. In this method, however, extremely high light intensity is generally required in order to cause saturable absorption, leading to such a new problem that information recorded in the recording layer may be destroyed by heat. While information must be recorded at larger light intensity than that in reproduction, recorded marks may be spread by an influence of thermal diffusion to disadvantageously reduce the recording density. When a material causing a reverse photochromic reaction is employed, the masking layer reacts by heat such that a coloring reaction of the mask layer may be simultaneously caused in reproduction by the heat reaction, leading to imperfect improvement in transmittance of the mask layer and reduction of the super resolution effect. Further, a bad influence may be exerted by the aforementioned thermal diffusion while recording efficiency may be reduced due to absorption of recording beam energy by the masking layer in recording. Further, it is impossible to attain compatibility between a super resolution optical disk which is provided with a masking layer and an ordinary optical disk provided with no masking layer in every one of the aforementioned techniques.

SUMMARY OF THE INVENTION

An object of the present invention is to provide a method enabling high-density recording/reproduction of information by a super resolution effect which is readily applicable to a medium other than a magneto-optical recording medium without a requirement for such high light intensity as that required for saturable absorption, further readily applicable to mark edge recording without influence exerted by thermal diffusion of a masking layer, and capable of attaining compatibility with an optical disk which does not employ a super resolution effect and a drive therefor, and an optical recording medium implementing this method.

The optical recording medium according to the present invention comprises a recording layer, and a masking layer containing photochromic dye molecules having absorption at the wavelength of a reproducing beam and causing a photochemical reaction by absorbing the reproducing beam and being reduced absorption.

The masking layer of the inventive optical recording medium is preferably set at an optical density of at least 0.3. It is possible to adjust the optical density by adjusting the concentration of the isomer of dye molecule or the film thickness, or by employing a material having a high molecular absorption coefficient. According to the present invention, the optical density is defined as follows:

optical density=molecular absorption coefficient [l/{mol·cm}]× thickness [cm] of masking layer×concentration [mol/l] of an isomer of the photochromic dye molecule in the masking layer.

The inventive recording method, which is adapted to record information by irradiating the recording layer of the aforementioned inventive optical recording medium with a recording beam, comprises the steps of previously irradiating the masking layer with a beam of a wavelength for the transmittance of the masking layer at the wavelength of the recording beam, and transmitting the recording beam through the masking layer which is improved in transmittance for irradiating the recording layer with the recording beam.

The inventive reproducing method, which is adapted to reproduce recorded information by irradiating the recording layer of the aforementioned inventive optical recording medium with a reproducing beam, comprises the steps of previously irradiating the masking layer with a beam of a wavelength for increasing the optical density of the masking layer at the wavelength of the reproducing beam and reducing its transmittance, and irradiating the masking layer, which is reduced in transmittance, with the reproducing beam of another wavelength thereby increasing transmittance of a portion of the masking layer corresponding to a rear portion, with respect to the relative movement direction of a reproducing beam spot, and irradiating the recording layer with the reproducing beam.

In the inventive reproducing method, the masking layer of the optical recording medium is preferably set at an optical density of at least 0.3, as hereinabove described.

Figure 1:
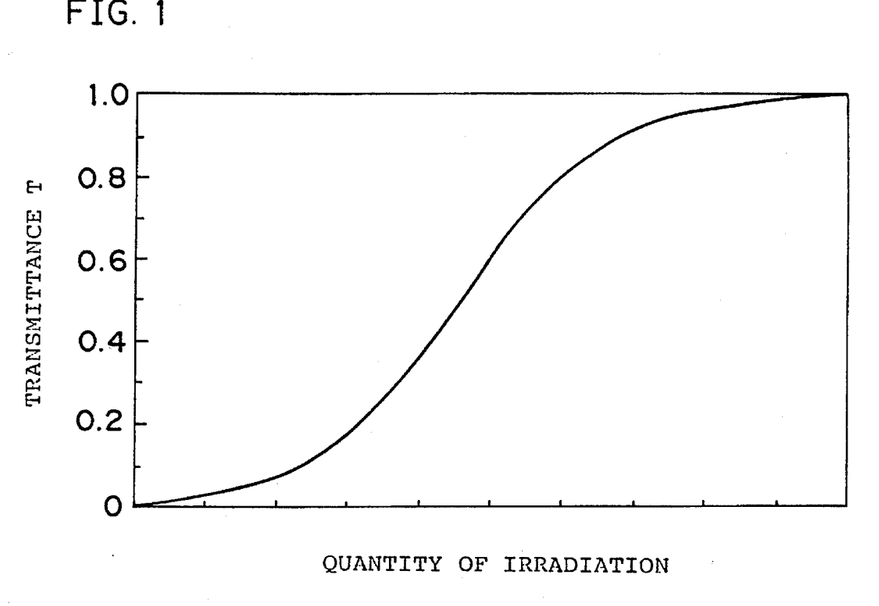
FIG. 1 illustrates the relation between the quantity of irradiation and transmittance in a masking layer containing photochromic dye molecules in the present invention.

According to the present invention, the masking layer is prepared from a layer containing photochromic dye molecules, for attaining high-density recording/reproduction of information by a super resolution effect through a nonlinear change in transmittance of the masking layer. FIG. 1 illustrates the relation between the quantity of irradiation and transmittance T in a masking layer containing photochromic dye molecules irradiated with a beam. As shown in FIG. 1, the transmittance T apparently nonlinearly changes with respect to the quantity of irradiation, although the optical reaction (isomerization) at the molecular level is linearly (uniphoton-unimolecularly) caused in the photochromic dye molecules. Such apparent nonlinearity remarkably appears when the optical density is set at a high level. Referring to FIG. 1, the abscissa is defined not by light intensity (in the unit of W/cm$^2$, for example) of the reproducing beam but by the quantity of irradiation (J/cm$^2$). Thus, it is not necessary to employ a reproducing beam having extremely high light intensity, dissimilarly to the conventional method having nonlinear light absorption (saturable absorption).

As hereinabove described, the nonlinear change of the transmittance of the masking layer containing photochromic dye molecules remarkably appears when the optical density is increased. Therefore, the effect of the present invention is attained also when the masking layer has a low optical density, while this effect is further improved when the optical density is set at a high level of at least 0.3, in particular. When the present invention is carried out, therefore, the optical density serves as an extremely important factor. As hereinabove described, it is possible to adjust the optical density by adjusting the concentration of the photochromic material or the thickness of the masking layer, or by employing a material having a high molecular absorption coefficient. The thickness of the masking layer is preferably set to be not more than the depth of focus of the reproducing beam.

According to the present invention, the transmittance of the masking layer provided in the recording medium apparently changes nonlinearly although the photochromic reaction progresses linearly at the molecule level, while the masking layer has absorption at the wavelength of the reproducing beam and causes the photochemical reaction by absorbing the reducing beam to be reproduced in absorption. The quantity of irradiation is at a high level on a track center portion of a reproducing laser beam spot and a rear portion of a relative movement, whereby the transmittance is increased in these portions by progress of such a photochemical reaction. On the other hand, the degree of reduction in transmittance is low in the peripheral portion of the reproducing laser beam spot, due to a small quantity of irradiation. Consequently, the recording layer is substantially irradiated with the reproducing beam in a region smaller than the reproducing laser beam spot. Thus, influences by recorded marks of adjacent tracks are masked so that it is possible to reduce the track pitch.

Figure 2:
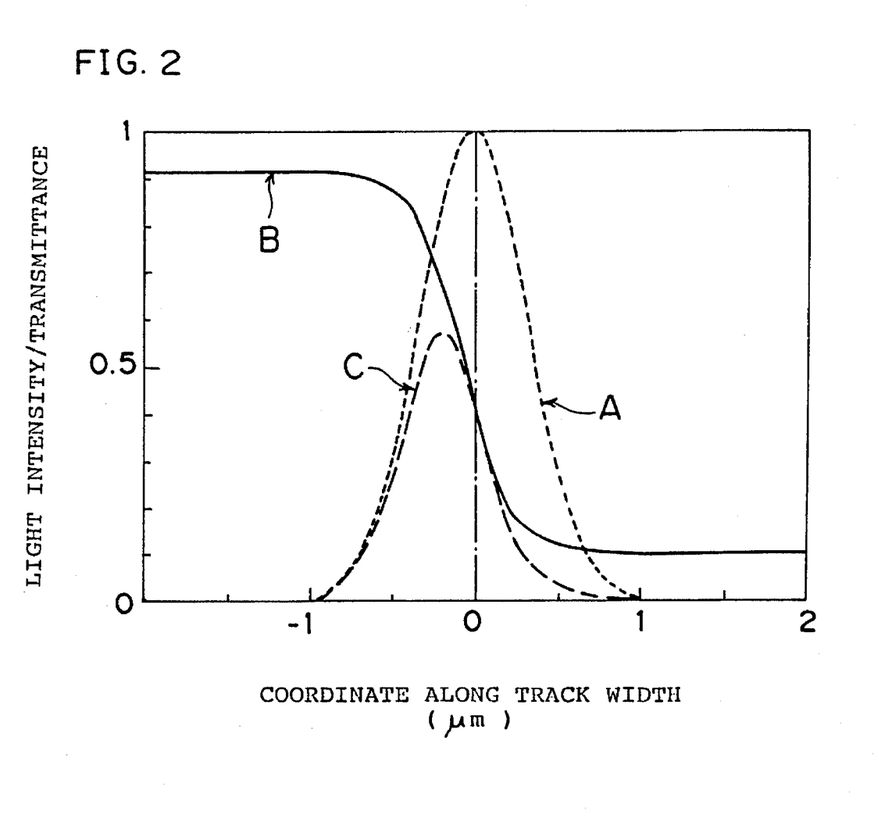
FIG. 2 illustrates distribution of light intensity in an effective super resolution spot along a track length obtained by scanning a masking layer having a high optical density with a reproducing beam spot.
Figure 3:
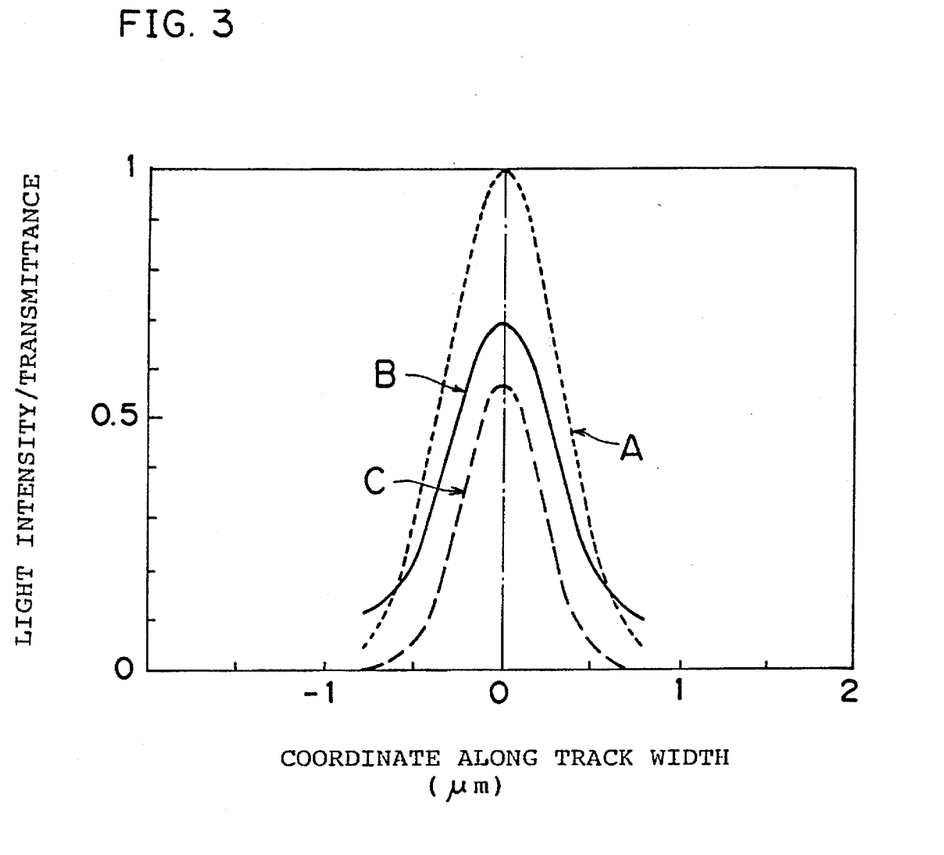
FIG. 3 illustrates distribution of light intensity in the effective super resolution spot along a track width obtained by scanning the masking layer having a high optical density with the reproducing beam spot.

FIGS. 2 and 3 illustrate light intensity distribution (A) of a reproducing laser beam spot, transmittance distribution (B) of a masking layer and light intensity distribution (C) in an effective spot by a super resolution effect of the masking layer in an optical recording medium provided with the masking layer having a high optical density of 0.5, which is scanned with the reproducing laser beam spot. Referring to FIGS. 2 and 3, the axes of abscissas are along the track width and the track length respectively.

As shown in FIG. 2, the transmittance distribution (B) of the masking layer is low in the front portion along the relative movement of the spot due to the insufficient quantity of irradiation, and hence influences by recorded marks positioned in the front portion of the spot are masked. Consequently, the light intensity distribution (C) in the effective spot is smaller than that in the original reproducing laser beam spot.

On the other hand, the width of the transmittance distribution (B) of the masking layer is narrower than that of the light intensity distribution (A) of the reproducing laser beam spot along the track width as shown in FIG. 3, while the light intensity distribution (C) in the effective spot is smaller than the light intensity distribution (A) of the reproducing laser beam spot. Consequently, influences by recorded marks of adjacent tracks are masked.

Figure 4:
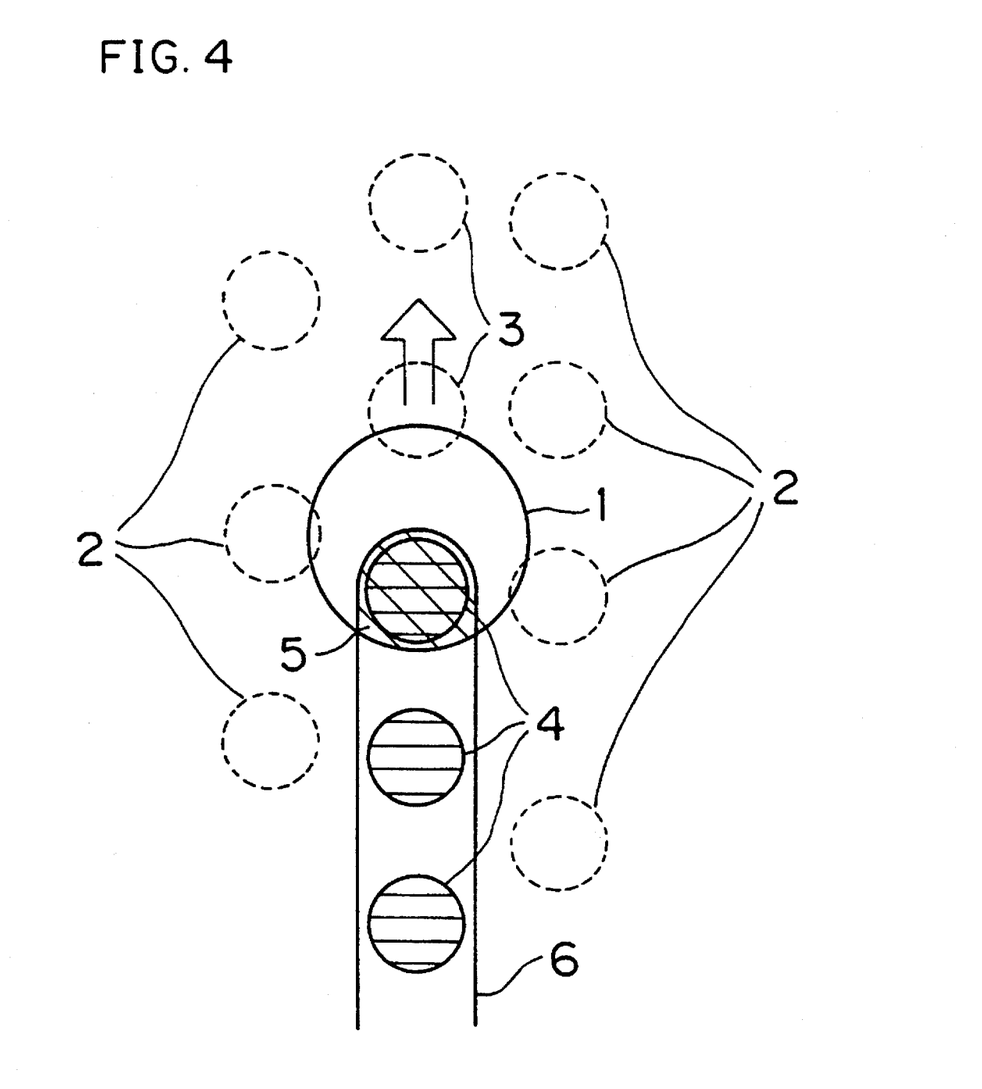
FIG. 4 is a model diagram showing formation of an effective super resolution spot in the masking layer having a high optical density shown in FIGS. 2 and 3.

FIG. 4 is a model diagram for illustrating formation of an effective spot by the super resolution effect of the masking layer described with reference to FIGS. 2 and 3. Referring to FIG. 4, a reproducing laser beam spot 1 moves along in the direction of the arrow. Unreproduced recorded marks 3 which are in masked states become recorded marks 4 when irradiated with the reproducing laser beam spot 1. Recorded marks 2 are present in tracks which are adjacent to that for reading information. Upon irradiation with the reproducing beam spot 1, the photochromic dye molecules contained in the masking layer cause a photochemical reaction as described above to be achromatized, thereby forming a region 6 having high transmittance in the masking layer. Thus, an effective spot for reproduction, which is defined by superposition of the reproducing laser beam spot 1 and the region 6 of the masking layer having improved transmittance, is smaller than the reproducing laser spot 1. Therefore, it is possible to reproduce information with no influences exerted by the recorded marks of the adjacent tracks, although the reproducing laser beam spot 1 reaches the recorded marks 2.

Figure 5:
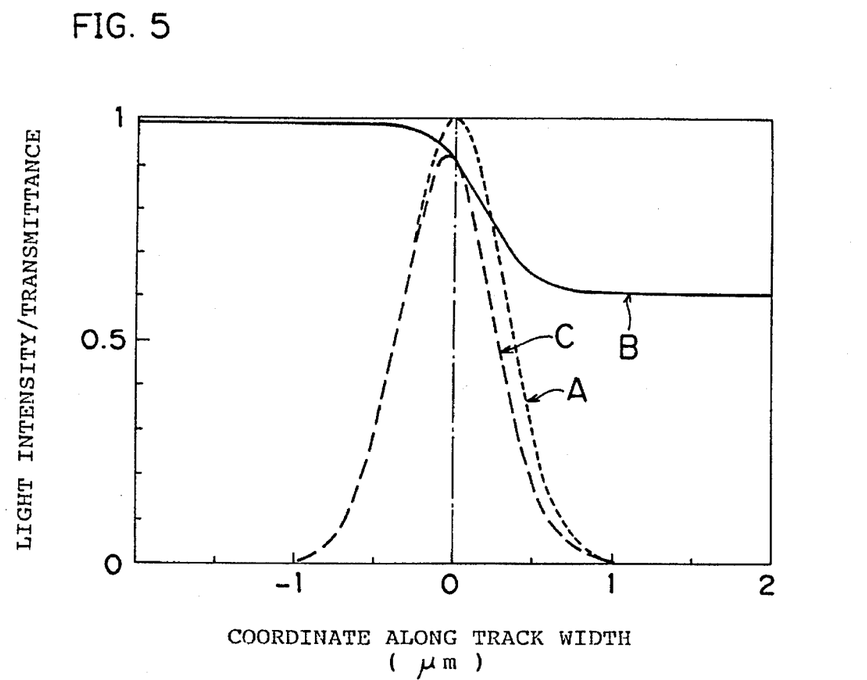
FIG. 5 illustrates distribution of light intensity in an effective super resolution spot along a track length obtained by scanning a masking layer having a low optical density with a reproducing beam spot.
Figure 6:
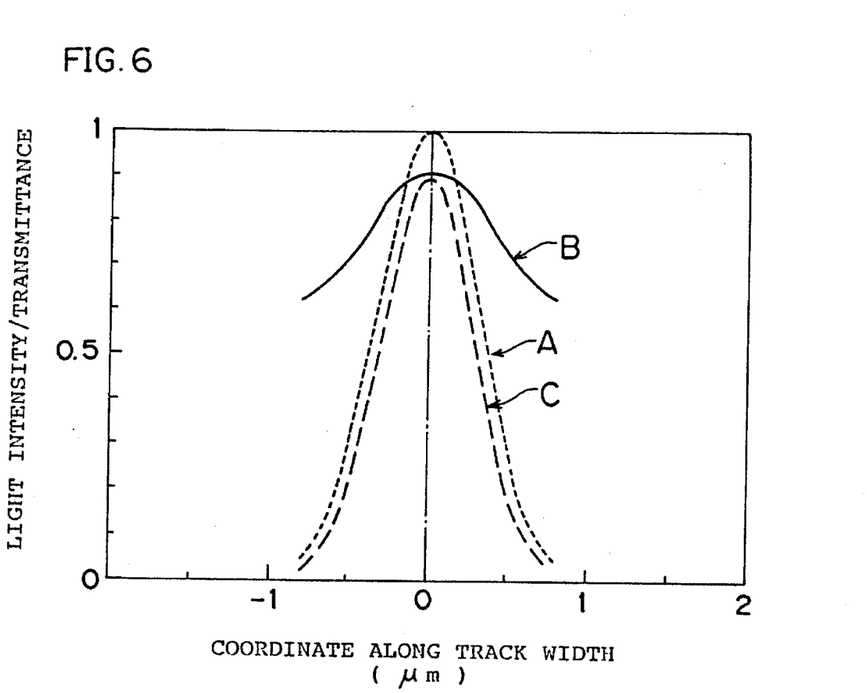
FIG. 6 illustrates distribution of light intensity in the effective super resolution spot along a track width obtained by scanning the masking layer having a low optical density with the reproducing beam spot.

FIGS. 5 and 6 illustrate light intensity distribution (A) of a reproducing laser beam spot, transmittance distribution (B) of a masking layer and light intensity distribution (C) in an effective spot as to a masking layer which is set at a low optical density of 0.1. Referring to FIGS. 5 and 6, the axes of abscissas are along the track length and the track width respectively. As understood from FIGS. 5 and 6, an effect of narrowing the effective spot diameter by a super resolution effect is slightly reduced as compared with the masking layer having a high optical density shown in FIGS. 2 and 3. While it is possible to improve the recording density to about twice in the case of FIGS. 2 and 3, the recording density is improved merely to about 1.2 times in the case of FIGS. 4 and 5.

Figure 7:
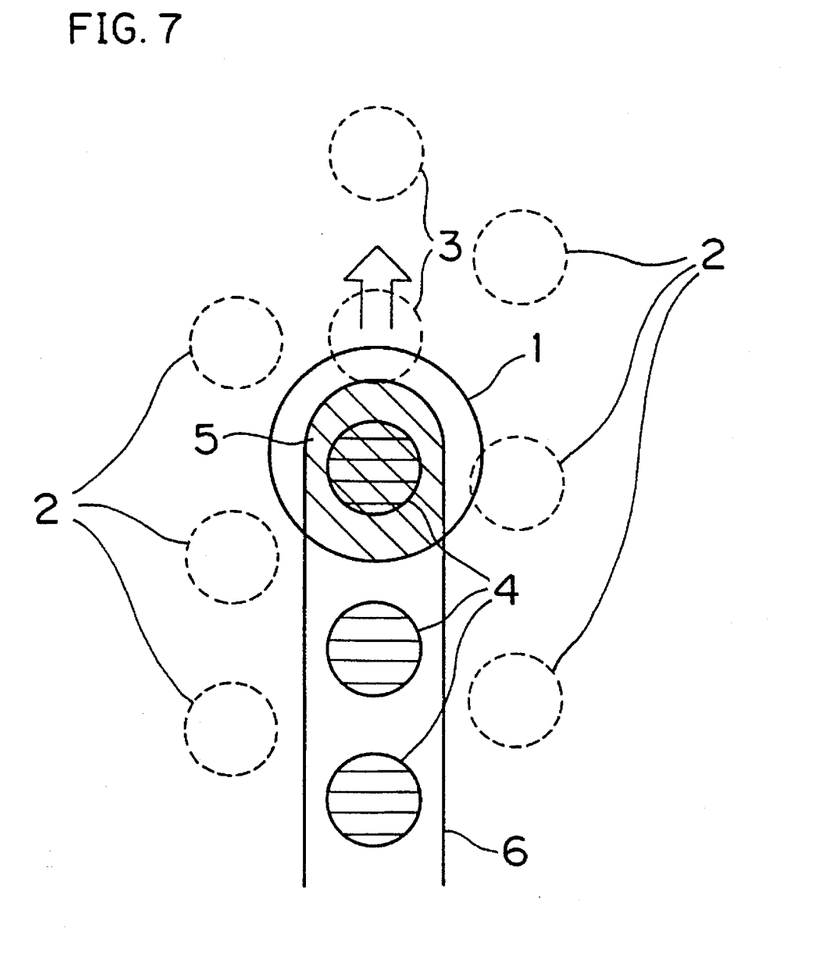
FIG. 7 is a model diagram showing formation of an effective super resolution spot in the masking layer having a low optical density shown in FIGS. 5 and 6.

FIG. 7 is a model diagram for illustrating formation of an effective spot by a super resolution effect in the masking layer having a low optical density of 0.1 shown in FIGS. 5 and 6. As shown in FIG. 7, a region 6 of the masking layer having high transmittance is larger than that shown in FIG. 4, and the effective spot has a larger diameter.

As clearly understood from the above, it is preferable to set the optical density of the masking layer at a high level of at least 0.3 in particular, in order to record/reproduce information in higher density.

The optical density of the masking layer can be increased by irradiating with the coloring light. The coloring of the masking layer corresponds to the increase in concentration of isomers in the coloring state which are produced by photon mode reaction of photochromic dye molecules being in the bleaching isomer state.

According to the present invention, contrary to the MSR system, no magnetic effect is employed, whereby the recording layer can be prepared from a phase change type material, in addition to a magneto-optical recording material. Further, the masking layer is formed by the photochromic dye molecules accompanied by no thermal reaction for attaining a super resolution effect in a photon mode, whereby information can be recorded in higher density with no influences by thermal diffusion and thermal reaction.

When recording efficiency may be reduced by a significant influence exerted by absorption of the recording beam by the masking layer in recording with the inventive optical recording medium, it is preferable to previously irradiate the masking layer with a beam of a wavelength for improving its transmittance, and to thereafter irradiate the same with the recording beam.

In general, however, information is recorded with a recording beam of strong intensity, and hence it is possible to improve the transmittance Of the masking layer by the action of the recording beam itself. Therefore, it is possible to record the information without previously irradiating the masking layer with the beam of a specific wavelength, dissimilarly to the above.

As hereinabove described, the optical recording medium according to the present invention is also applicable to a heat mode medium such as a magneto-optical recording medium or a phase change type medium. In this case, recording and reproducing beams are generally emitted from the same laser at different intensity levels.

In the super resolution optical recording medium according to the present invention, recording/reproduction can be performed by a conventional drive to attain compatibility, when the elements other than the masking layer are in the same structure as the already practicized medium and the masking layer is achromatized by a photon mode photochromic reaction to be optically transparent state. Further, since the drive for the inventive super resolution recording/reproducing method may be in the conventional structure except a masking layer coloring beam, it is possible to record/reproduce information in/from a ordinary medium which is not the super resolution optical recording medium, for example, by simply turning off the coloring beam, thereby attaining compatibility. Namely, it is possible to record/reproduce information in/from the inventive super resolution optical recording medium with the conventional drive, while the super resolution drive employing the inventive system can record/reproduce information in/from the ordinary optical recording medium.

According to the present invention, the masking layer containing the photochromic dye molecules having absorption at the wavelength of the reproducing beam and causing a photochemical reaction by absorbing the reproducing beam to be reduced in absorption is provided preferably on a side of the recording layer receiving the reproducing beam. Due to provision of such a masking layer, it is possible to reduce an effective spot for reproduction as compared with the reproducing beam spot by a super resolution effect, thereby enabling high density recording/reproduction of information.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 8:
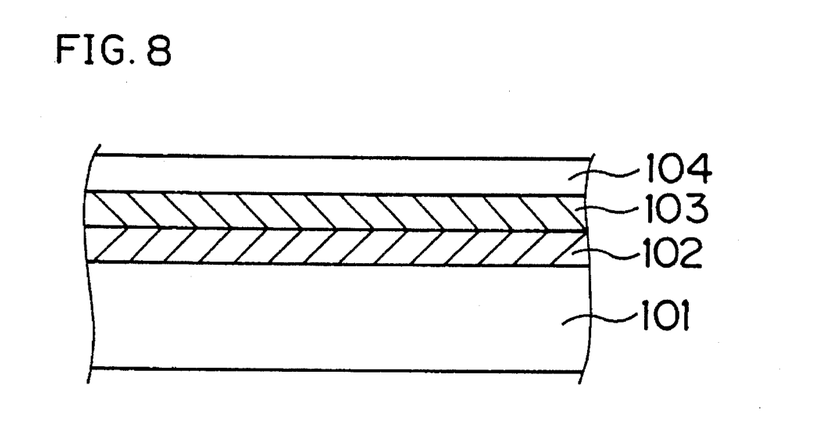
FIG. 8 is a sectional view showing an optical recording medium according to an embodiment of the present invention.

FIG. 8 is a sectional view showing an optical recording medium according to an embodiment of the present invention. Referring to FIG. 8, a masking layer 102 containing a coloring material which is reduced in absorption by irradiation with a reproducing beam is formed on a transparent substrate 101, while a recording layer 103 and a protective layer 104 are successively formed on the masking layer 102. In this embodiment, a TbFeCo magneto-optical material was employed for preparing the recording layer 103, which can be made of any material such as a conventional magneto-optical material or a conventional phase change material. Further, the masking layer 102 was prepared from diarylethene photochromic dye molecules.

Figure 9:
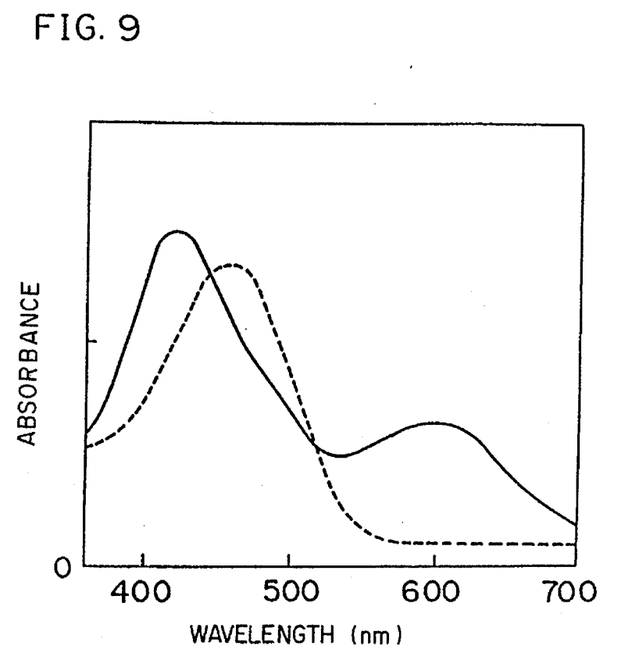
FIG. 9 illustrates absorption spectra of photochromic dye molecules employed in the embodiment of the present invention.

FIG. 9 illustrates absorption spectra of the diarylethene photochromic dye molecules having the aforementioned molecular structure. The photochromic dye molecules cause a ring-closing reaction (coloring reaction) when the same are irradiated with light of about 450 nm in wavelength in the state shown by the broken line in FIG. 9, and change to the state shown by the solid line in which the photochromic dye molecules are the isomers in the coloring state. On the other hand, the molecules exhibit a ring-opening reaction (bleaching reaction) when the same are irradiated with light of about 600 nm in wavelength in the state shown by the solid line, to return to the state shown by the broken line in which the photochromic dye molecules are the isomers in the bleaching state. In order to reproduce recorded information by using a semiconductor laser beam of about 630 nm in wavelength, for example, the photochromic dye molecules forming the masking layer 102 are brought into the state of the broken line and irradiated with the laser beam of 630 nm in wavelength to cause a ring-opening reaction, thereby reproducing the information while reducing absorption of the masking layer 102. The coloring of the masking layer 102 is performed by irradiating with the coloring light of 450 nm in wavelength. The diarylethene dye molecules employed in this embodiment, which are thermally stable in both states and are accompanied by no thermal reaction, are preferably employed for the photochromic dye molecules contained in the masking layer 102 in the present invention.

The aforementioned dye molecules were mixed into polystyrene resin and dissolved in cyclohexanone, for forming thin films of 0.3 μm in thickness by spin coating, thereby preparing masking layers. The concentrations of the dye molecules were adjusted to prepare samples provided with masking layers having a high optical density of 0.5 and a low optical density of 0.1 respectively, while a comparative sample was prepared with no masking layer. Data were recorded/reproduced in/from these samples under various frequencies at a relative speed of 1.4 m/sec., for comparing track recording densities (outputs of a high frequency region) with each other. The data were reproduced at constant power of 1.5 mW.

Figure 10:
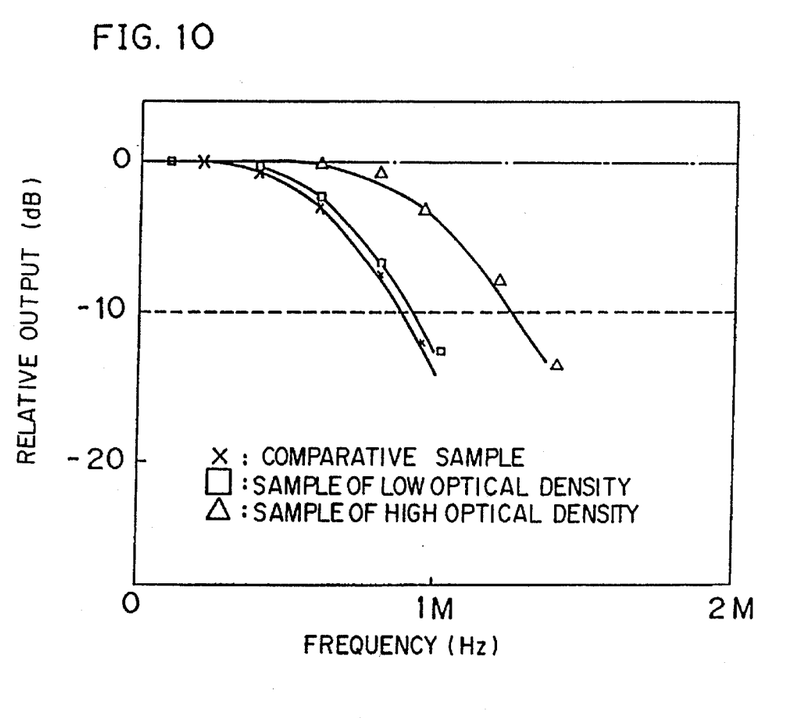
FIG. 10 illustrates frequency characteristics of reproducing signals in samples according to Example of the present invention.

FIG. 10 shows frequency characteristics of reproducing signals in these samples with reference to output values (0 dB) at a low frequency. As clearly understood from FIG. 10, the outputs were reduced by 10 dB at frequencies of 0.87 MHz (corresponding to a mark length of 0.80 μm), 0.9 MHz (corresponding to a mark length of 0.78 μm) and 1.25 MHz (corresponding to a mark length of 0.56 μm) in the comparative sample and the samples having low and high optical densities respectively. Thus, it is understood that it is possible to improve the track recording density by providing a masking layer in accordance with the present invention.

Figure 11:
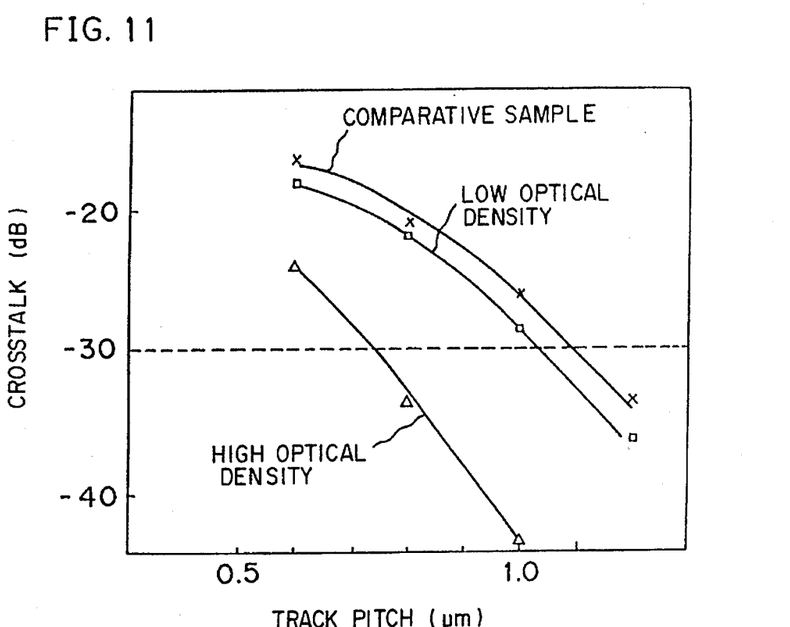
FIG. 11 illustrates relations between track pitches and track-to-track crosstalks in recording/reproduction of the samples according to Example.

FIG. 11 shows relations between track pitches and track-to-track crosstalks upon recording/reproduction under the same conditions as the above. As clearly understood from FIG. 11, it is possible to reduce the track pitch which can achieve a crosstalk reference value of −30 dB required for digital recording, for example, as the optical density of the masking layer is increased, thereby improving the track density. In more concrete terms, the comparative sample and the sample having a low optical density have track pitches of about 1.1 μm and about 1.04 μm respectively, while it is possible to set the track pitch of the sample having a high optical density at about 0.75 μm. It is assumed here that the comparative sample has an optical density of zero.

As clearly understood from the aforementioned results, it is possible to improve both of the track recording density and the track reproducing density by providing the masking layer containing photochromic dye molecules according to the present invention.

Figure 12:
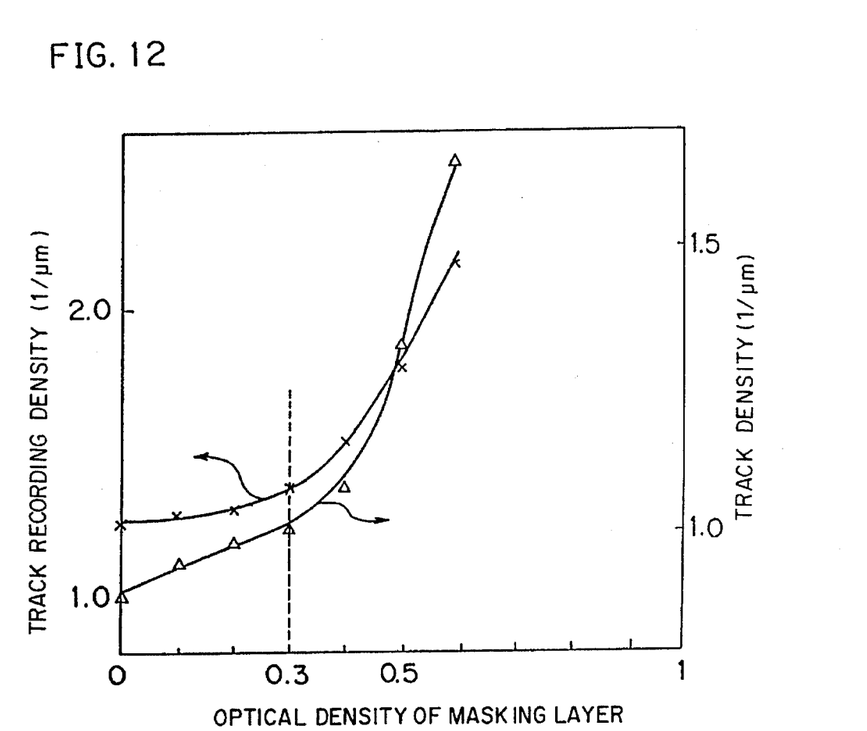
FIG. 12 illustrates recording densities in relation to various optical densities of masking layers.

FIG. 12 illustrates inverse numbers of mark lengths and track pitches which were measured similarly to the above while further varying optical densities of the masking layers. It is clearly understood from FIG. 12 that the recording densities were improved with increase in the optical densities, and remarkably increased particularly when the optical densities exceeded 0.3. As to a high optical density, it is possible to attain an effect in excess of the increased ratios shown in FIG. 12 by properly increasing the reproducing power in response.

While the dye molecules were mixed into polystyrene for forming the masking layers by spin coating in the aforementioned samples, the resin to be mixed with the dye molecules is not restricted to the polystyrene resin but may alternatively be prepared from another resin. Further, a thin film for forming the masking layer may alternatively be prepared from only the dye molecules, which are not mixed with a polymer. While the masking layer may be slightly reduced in strength, it is possible to improve the optical density without increasing the film thickness in this case. Further, the masking layer may be formed by vacuum deposition of the coloring material, in place of coating. The masking layer is preferably set at a thickness which is smaller than the depth of focus (1 μm, for example) of the reproducing laser beam spot.

While the dye molecules to be contained in the masking layer are prepared from diarylethene photochromic molecules in the above description, the present invention is not restricted to this but is applicable to photochromic molecules causing no reaction by heat.

While the above description has been made with reference to a magneto-optical recording medium, the present invention is also applicable to a phase change type medium, a medium which is dedicated to reproduction or the like. In the medium dedicated to reproduction, a reflective layer for recording information through a pit of surface corresponds to the recording layer. The present invention is also readily applicable to a shorter-wavelength laser or mark edge recording, and readily compatible with a medium or an apparatus employing no super resolution technique.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of reproducing recorded information in a recording layer of an optical recording medium comprising:

a recording layer, and a masking layer containing a photochromic dye which absorbs radiation in a wavelength of a reproducing beam and thereby causes a photon mode reaction of said photochromic dye so that the transmittance of said masking layer, relative to the passage of said reproducing beam therethrough, is increased, said method comprising the steps of:

previously irradiating said masking layer with a beam of a wavelength, which is different from the wavelength of said reproducing beam, for reducing transmittance of said masking layer to said reproducing beam; and irradiating said masking layer, which has become reduced in transmittance, with said reproducing beam, while moving said optical recording medium relative to said reproducing beam, sufficient to cause a photon mode reaction of said photochromic dye and to thereby improve transmittance of a portion of said masking layer corresponding to a rear portion of a reproducing beam spot thereby allowing said reproducing beam to reach said recording layer.

2. The method of reproducing in accordance with claim 1, wherein said previously irradiating step comprises a step of previously irradiating with said beam having said different wavelength so that the optical density of said masking layer at said wavelength of said reproducing beam is at least 0.3.

3. The method of reproducing in accordance with claim 1, wherein said masking layer is formed by a polymer film containing said photochromic dye.

4. The method of reproducing in accordance with claim 1, wherein said photochromic dye comprises a diarylethene.

5. The method of reproducing in accordance with claim 1, wherein said masking layer is provided on a reproducing beam entrance side of said recording layer.

6. The method of reproducing in accordance with claim 1, wherein said masking layer is that being apparently nonlinearly, increased in transmittance at said wavelength of said reproducing beam in response to increase in quantity of irradiation of said reproducing beam.

7. A method of recording information in a recording layer of an optical recording medium comprising:

a recording layer, and a masking layer containing a photochromic dye which absorbs radiation in a wavelength of a reproducing beam and thereby causes a photon mode reaction of said photochromic dye so that the transmittance of said masking layer, relative to the passage of said reproducing beam therethrough, is increased, said photochromic dye also absorbing radiation in a wavelength different from a wavelength of a recording beam and thereby causing a photon mode reaction so that the transmittance of said masking layer, relative to the passage of said recording beam therethrough, is increased, said method comprising the steps of:

previously irradiating said masking layer with a beam of said wavelength different from said wavelength of said recording beam for improving said transmittance of said masking layer relative to the passage of said recording beam; and then irradiating with said recording beam and transmitting the same through said masking layer of said improved transmittance into said recording layer.

8. A method of recording information in a recording layer of an optical recording medium comprising:

a recording layer, and a masking layer containing a photochromic dye which absorbs radiation in a wavelength of a reproducing beam and thereby causes a photon mode reaction of said photochromic dye so that the transmittance of said masking layer, relative to the passage of said reproducing beam therethrough, is increased, said photochromic dye also absorbing radiation in a wavelength of a recording beam and thereby causing a photon mode reaction so that the transmittance of said masking layer, relative to the passage of said recording beam therethrough, is increased, said method comprising the steps of:

irradiating said masking layer with said recording beam and thereby improving said transmittance of said masking layer relative to the passage of said recording beam; and then transmitting said recording beam through said masking layer having said improved transmittance into said recording layer.

* * * * *